(12) United States Patent
Tseng et al.

(10) Patent No.: US 8,965,438 B2
(45) Date of Patent: Feb. 24, 2015

(54) ANTENNA SELECTION METHOD AND DEVICE

(75) Inventors: Kuo-Wei Tseng, Taipei (TW); Chien-Chia Chen, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 705 days.

(21) Appl. No.: 13/100,270

(22) Filed: May 3, 2011

(65) Prior Publication Data
US 2012/0142295 A1 Jun. 7, 2012

(30) Foreign Application Priority Data
Dec. 7, 2010 (TW) .............................. 099142632 A

(51) Int. Cl.
H04B 17/00 (2006.01)
H04B 17/02 (2006.01)
H04B 7/00 (2006.01)
H04B 7/08 (2006.01)

(52) U.S. Cl.
CPC ..................................... *H04B 7/082* (2013.01)
USPC ..................... 455/513; 455/67.11; 455/135

(58) Field of Classification Search
CPC .... H04B 7/0608; H04B 7/082; H04B 7/0602; H04B 7/0686; H04W 24/02; H04W 24/08
USPC ........... 455/500, 501, 507, 513, 67.11, 67.13, 455/69, 132, 134, 135, 193.1, 226.1
See application file for complete search history.

(56) References Cited

U.S. PATENT DOCUMENTS

| 6,754,473 | B1 * | 6/2004 | Choi et al. ..................... 455/101 |
| 7,492,842 | B2 | 2/2009 | Yen |
| 2003/0002594 | A1 * | 1/2003 | Harel et al. .................... 375/299 |
| 2005/0206564 | A1 * | 9/2005 | Mao et al. ....................... 342/377 |
| 2005/0208897 | A1 * | 9/2005 | Lyons et al. ................ 455/67.11 |
| 2007/0230403 | A1 * | 10/2007 | Douglas et al. ................ 370/334 |
| 2008/0009322 | A1 * | 1/2008 | Kim ............................ 455/562.1 |
| 2009/0086647 | A1 * | 4/2009 | Shnaider et al. ............... 370/252 |
| 2009/0239565 | A1 * | 9/2009 | Han et al. ....................... 455/512 |
| 2009/0291699 | A1 * | 11/2009 | Heath et al. .................... 455/501 |
| 2010/0081467 | A1 * | 4/2010 | Alex et al. ...................... 455/509 |
| 2010/0159845 | A1 * | 6/2010 | Kaaja et al. ...................... 455/70 |
| 2010/0285752 | A1 * | 11/2010 | Lakshmanan et al. ........ 455/63.1 |
| 2012/0027111 | A1 * | 2/2012 | Vook et al. ..................... 375/267 |

FOREIGN PATENT DOCUMENTS

| TW | 200513056 | 4/2005 |
| TW | 200939653 | 9/2009 |

* cited by examiner

*Primary Examiner* — Andrew Wendell
(74) *Attorney, Agent, or Firm* — Winston Hsu; Scott Margo

(57) ABSTRACT

An antenna selection method includes respectively utilizing each antenna of a plurality of antennas to receive a plurality of transmission signals from a plurality of stations to generate a plurality of reception signals, respectively estimating a plurality of signal quality indicators corresponding to the plurality of stations according to the plurality of reception signals for each of the plurality of antennas, calculating a weighted sum of the plurality of corresponding signal quality indicators to generate a calculation result for each of the plurality of antennas, and selecting a receiving antenna from the plurality of antennas according to the corresponding calculation result of each of the plurality of antennas.

20 Claims, 4 Drawing Sheets

ANTENNA SELECTION METHOD AND DEVICE

BACKGROUND OF THE INVENTION

1. Field of the Invention

The present invention relates to an antenna selection method and related device, and more particularly, to an antenna selection method capable of estimating wireless signal strength via weighted distribution and related device.

2. Description of the Prior Art

Advances in wireless network technologies, in addition to convenience and mobility of wireless networks, have led to an increasing amount of wireless communication network applications. Generally, in a wireless communication network, environmental effects cause wireless signals to suffer unknown phase shift and amplitude attenuation during transmission, resulting in interference in signals received by a receiving terminal and signal distortion, affecting signal transmission efficiency.

Therefore, to enhance signal transmission efficiency, conventional techniques often utilize antenna diversity techniques to solve the above-mentioned issues. Generally, antenna diversity mainly evaluates a wireless link according to measured signal strength information gathered at the receiving terminal, to determine a quality of received antenna signals, and selects a receiving antenna from multiple antennas to implement signal reception. For example, antenna diversity techniques often select an antenna with the strongest received signal strength from multiple antennas as the receiving antenna, to provide a user station to connect and start transmission. Please refer to FIGS. 1A and 1B, which are schematic diagrams of each antenna of a conventional wireless network system 10 during transmission with user stations, respectively. The wireless network system 10 includes an access point AP, antennas ANT1, ANT2 and user stations STA_A, STA_B. As shown in FIG. 1A, assume a received signal strength indication (RSSI) value of a packet signal of the antenna ANT1 received by the user station STA_A is −75 dBm, and a RSSI value of a packet signal of the antenna ANT1 received by the user station STA_B is −91 dBm. Therefore, for the antenna ANT1, an average RSSI corresponding to each user station is −83 dBm. Next, as shown in FIG. 1B, assume a RSSI value of a packet signal of the antenna ANT2 received by the user station STA_A is −82 dBm, and a RSSI value of a packet signal of the antenna ANT2 received by the user station STA_B is −86 dBm. Therefore, for the antenna ANT2, an average RSSI corresponding to each user station is −84 dBm. As such, the antenna ANT1 has a higher average RSSI value for each of the user stations; therefore, conventional techniques select the antenna ANT1 as the receiving antenna, such that the user stations STA_A and STA_B may connect to the access point AP via the antenna ANT1 to commence communication.

However, although the aforementioned antenna selection method ensures transmission and also a better connection quality between the user station having a higher RSSI value and a corresponding receiving antenna, the access point AP fails to cover as much range in the wireless network system as possible. For example, usually a RSSI of −80 dBm and above is considered excellent signal transmission strength; therefore, there is an optimal signal transmission between the antenna ANT1 and the user station STA_A in FIG. 1A. The RSSI value between the antenna ANT1 and the user station STA_B is −91 dBm, and the signal strength is considered too weak for connecting a transmission in practical operations. Conversely, as shown in FIG. 1B, RSSI values between the antenna ANT2 and the user station STA_A, and between the antenna ANT2 and the user station STA_B are −82 dBm and −86 dBm, respectively. Though not considered excellent, these signal transmission strengths still meet connection requirements for conducting normal communication and transmission. However, ultimately the antenna ANT2 is not selected for communication. In other words, for antenna selection, the prior art focuses on user stations with exceptionally strong signal strengths when signal strengths are stronger between the antenna and user stations, but neglects user stations having signal strengths that are not excellent, but nevertheless adequate for normal transmission. Simply put, though the above-mentioned conventional receiving antenna selection method ensures optimal connection quality between certain user stations and the receiving antenna, it precludes a transmission connection opportunity for other user stations, and thus reducing an overall signal transmission efficiency.

Furthermore, to obtain RSSI values of each receiving signals, the prior art directly obtains a RSSI for corresponding antennas recorded in baseband receiving signals, e.g. reading a RSSI value recorded in an address R50 of the receiving signals as signal strength information of the receiving signals. However, in such cases, the receiving signals may be a multicast beacon signal of the wireless network system or a unicast signal related to the corresponding access point. Since the prior art techniques are unable to determine whether or not a received signal is related to the corresponding access point when obtaining RSSI for receiving signals, the aforementioned unrelated signal strength information would easily be mistaken as basis for determination; as such, it is easy to mistakenly select an antenna with higher signal interference in an open network environment. In short, unless placed in a "clean" wireless network environment, antenna switching selection would be easily interfered by other surrounding wireless devices unrelated to the corresponding access point.

SUMMARY OF THE INVENTION

Therefore, the primary objective of the present invention is to provide an antenna selection method and related device.

The present invention discloses an antenna selection method, including utilizing each of a plurality of antennas to receive a plurality of transmission signals from a plurality of stations, respectively, to generate a plurality of reception signals; estimating a plurality of signal quality indicators corresponding to the plurality of stations according to the plurality of reception signals for each of the plurality of antennas, respectively; calculating a weighted sum of the plurality of corresponding signal quality indicators to generate a calculation result for each of the plurality of antennas; and selecting a receiving antenna from the plurality of antennas according to the corresponding calculation result of each of the plurality of antennas, respectively.

The present invention further discloses an antenna selection device for a wireless network system having a plurality of antennas, including a signal conversion unit, coupled to the plurality of antennas, for converting a plurality of transmission signals received by the plurality of antennas into a plurality of reception signals, wherein the plurality of transmission signals are from a plurality of stations of the wireless network system; a signal quality estimation unit, coupled to the signal conversion unit, for estimating a plurality of signal quality indicators corresponding to the plurality of stations according to the plurality of reception signals, respectively; a setting unit, coupled to the signal quality estimation unit, for generating a plurality of weight factors according to the plurality of signal quality indicators; a signal calculation unit, coupled to the signal quality estimation unit and the setting unit, for calculating a weighted sum of the plurality of corresponding signal quality indicators to generate a calculation result for each the plurality of antennas; and a decision unit, coupled to the signal calculation unit, for selecting a receiving antenna from the plurality of antennas according to corresponding calculation results of the plurality of antennas, respectively, to provide at least an access point in the wireless network system and the plurality of stations to build a communication connection.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
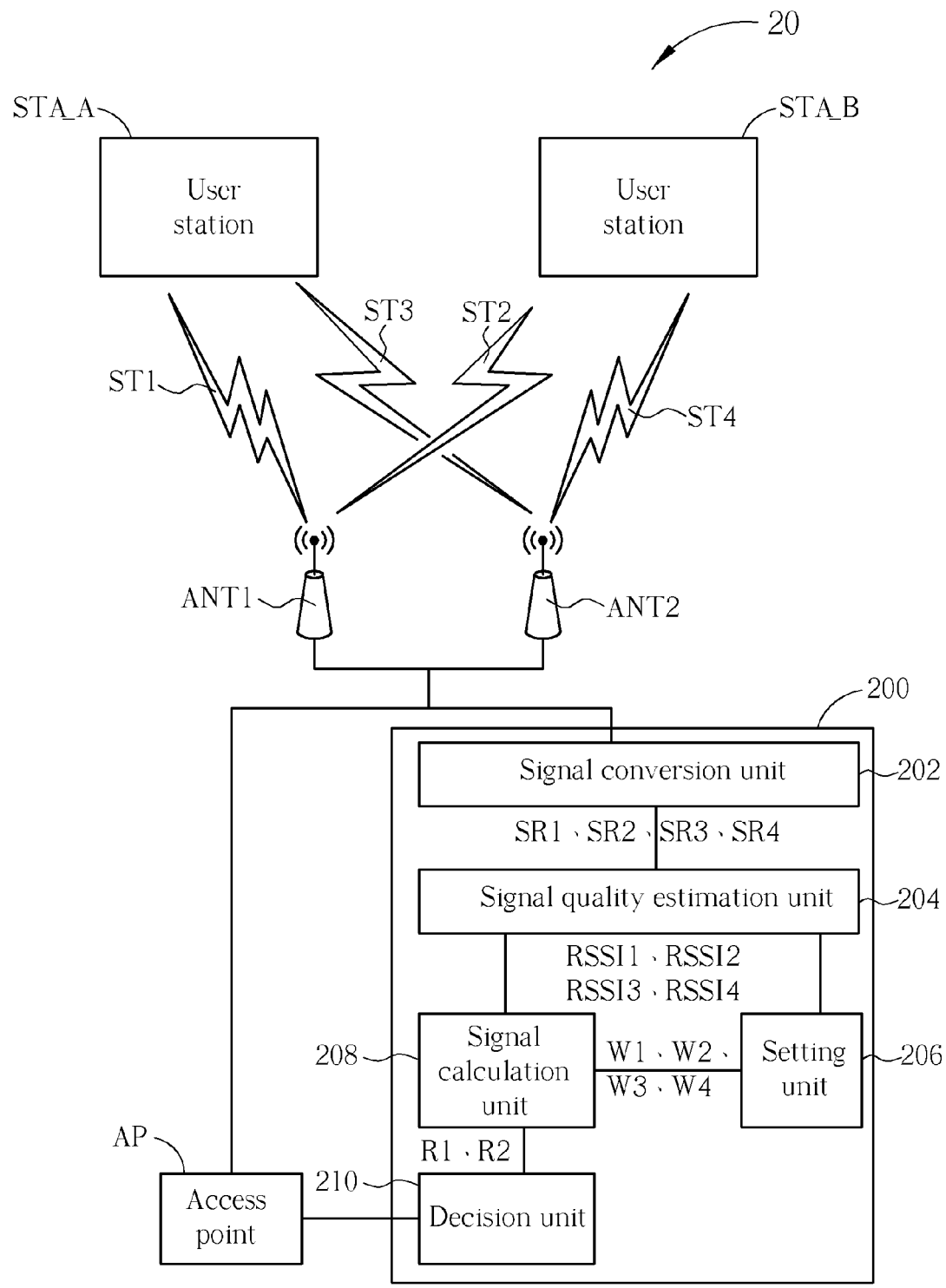
FIG. 2 is a schematic diagram of a wireless network system according to an embodiment of the present invention.

Please refer to FIG. 2, which is a schematic diagram of a wireless network system 20 according to an embodiment of the present invention. Preferably, the wireless network system 20 conforms to IEEE 802.11 wireless local area network (LAN) standards, but is not limited thereto. The wireless network system 20 includes user stations STA_A, STA_B, antennas ANT1, ANT2, an antenna selection device 200 and an access point AP. In the wireless network system 20, the user stations STA_A and STA_B may transmit and receive wireless signals to/from the access point AP via the antenna ANT1 or the antenna ANT2 to build communication transmission with the access point AP. To accommodate mobility and arbitrary connectivity characteristics of the wireless network system, the antenna selection device 200 selects a suitable receiving antenna from the antennas ANT1 and ANT2 every specific time interval, such that the user stations STA_A and STA_B may build high quality transmissions with the access point AP via the selected receiving antenna. As shown in FIG. 2, the antennas ANT1 and ANT2 are coupled to the antenna selection device 200, respectively. The antenna ANT1 can be used for receiving transmission signals ST1 and ST2 transmitted by the user stations STA_A and STA_B, and the antenna ANT2 can be used for receiving transmission signals ST3 and ST4 transmitted by the user stations STA_A and STA_B. Furthermore, after the antenna ANT1 receives the transmission signals ST1 and ST2, the transmission signals ST1 and ST2 are converted into reception signals SR1 and SR2 by the antenna selection device 200. Next, the antenna selection device 200 generates a calculation result R1 corresponding to the antenna ANT1 according to the reception signals SR1 and SR2; similarly, after the antenna ANT2 receives the transmission signals ST3 and ST4, the transmission signals ST3 and ST4 are converted to reception signals SR3 and SR4 via the antenna selection device 200, which then generates a calculation result R2 corresponding to the antenna ANT2. Finally, the antenna selection device 200 may either select the antenna ANT1 or the antenna ANT2 as the receiving antenna according to calculation results R1 and R2, for the user stations STA_A and STA_B to connect to the access point AP.

In more details, the antenna selection device 200 includes a signal conversion unit 202, a signal quality estimation unit 204, a setting unit 206, a signal calculation unit 208 and a decision unit 210. The signal conversion unit 202 is coupled to the antenna ANT1 and the antenna ANT2, and is used for converting the transmission signals ST1, ST2, ST3 and ST4 received via the antennas ANT1 and ANT2 into the reception signals SR1, SR2, SR3 and SR4, respectively. The signal quality estimation unit 204 is coupled to the signal conversion unit 202, and is used for estimating signal quality indicators RSSI1, RSSI2, RSSI3 and RSSI4 according to the reception signals SR1, SR2, SR3 and SR4, respectively. The setting unit 206 is coupled to the signal quality estimation unit 204 and the signal calculation unit 208, and is used for generating corresponding weight factors W1, W2, W3 and W4 according to the signal quality indicators RSSI1, RSSI2, RSSI3 and RSSI4. The signal calculation unit 208 is coupled to the signal quality estimation unit 204 and the setting unit 206, and is used for calculating a weighted sum of the corresponding signal quality indicators to generate a calculation result according to the weight factors W1, W2, W3 and W4. For instance, in the wireless network system 20, the signal calculation unit 208 generates the calculation result R1 corresponding to the antenna ANT1 after calculating a weighted sum of the signal quality indicators RSSI1, RSSI2; and generates the calculation result R2 corresponding to the antenna ANT2 after calculating a weighted sum of the signal quality indicators RSSI3, RSSI4. In other words, the signal calculation unit 208 arranges different weight factors for different signal quality indicators to perform the weighted sum calculation. Note that, the value of each weight factor used by the signal calculation unit 208 to calculate the weighted sum is correlated to the corresponding signal quality indicator. For example, when the signal quality indicator or average of the signal quality indicators is higher, the corresponding weight factor is smaller, and vice versa, but ways of this correlation are not limited thereto. On the other hand, a sum of all the weight factors corresponding to the signals received by a same antenna is a constant value, e.g. W1+W2=1. The decision unit 210 is coupled to the signal calculation unit 208, and is used for selecting an antenna from the antennas ANT1 and ANT2 as the receiving antenna according to the calculation results R1 and R2, such that the user stations STA_A and STA_B may build a communication connection with the access point AP accordingly. In other words, the present invention provides a more precise basis of determination via distributing different weights to the signal quality indicators of the reception signals.

Simply put, the prior art focuses on user stations with exceptionally strong signal strengths during antenna selection, and neglects user stations with signal strengths that are not excellent, but nevertheless sufficient for normal connection transmission. Comparatively, the present invention can sample signal strengths more precisely by estimating an overall average signal strength between related user stations and the antenna via arranging different weight factors for signal quality indicators of different magnitudes, and thus is capable of making correct antenna selections accordingly. As such, for antenna diversity applications, it is possible to effectively cover all of the user stations within entire range of the wireless network system while ensuring connection quality, thereby vastly enhancing overall system transmission efficiency.

Furthermore, note that the wireless network system 20 shown in FIG. 2 is an embodiment of present invention, and different modifications or alterations may be made accordingly by those skilled in the art, and are not limited thereto. For example, for illustrative purposes, only two user stations, two antennas and one access point are shown in the present embodiment, but a quantity of the antennas, access points and user stations may be varied according to an environment of the communication system, and is not limited thereto. In practice, each component of the antenna selection device 200 may be independently implemented with hardware, firmware or software, or may be integrated into a design of the access point of the wireless network system 20.

Figure 3:
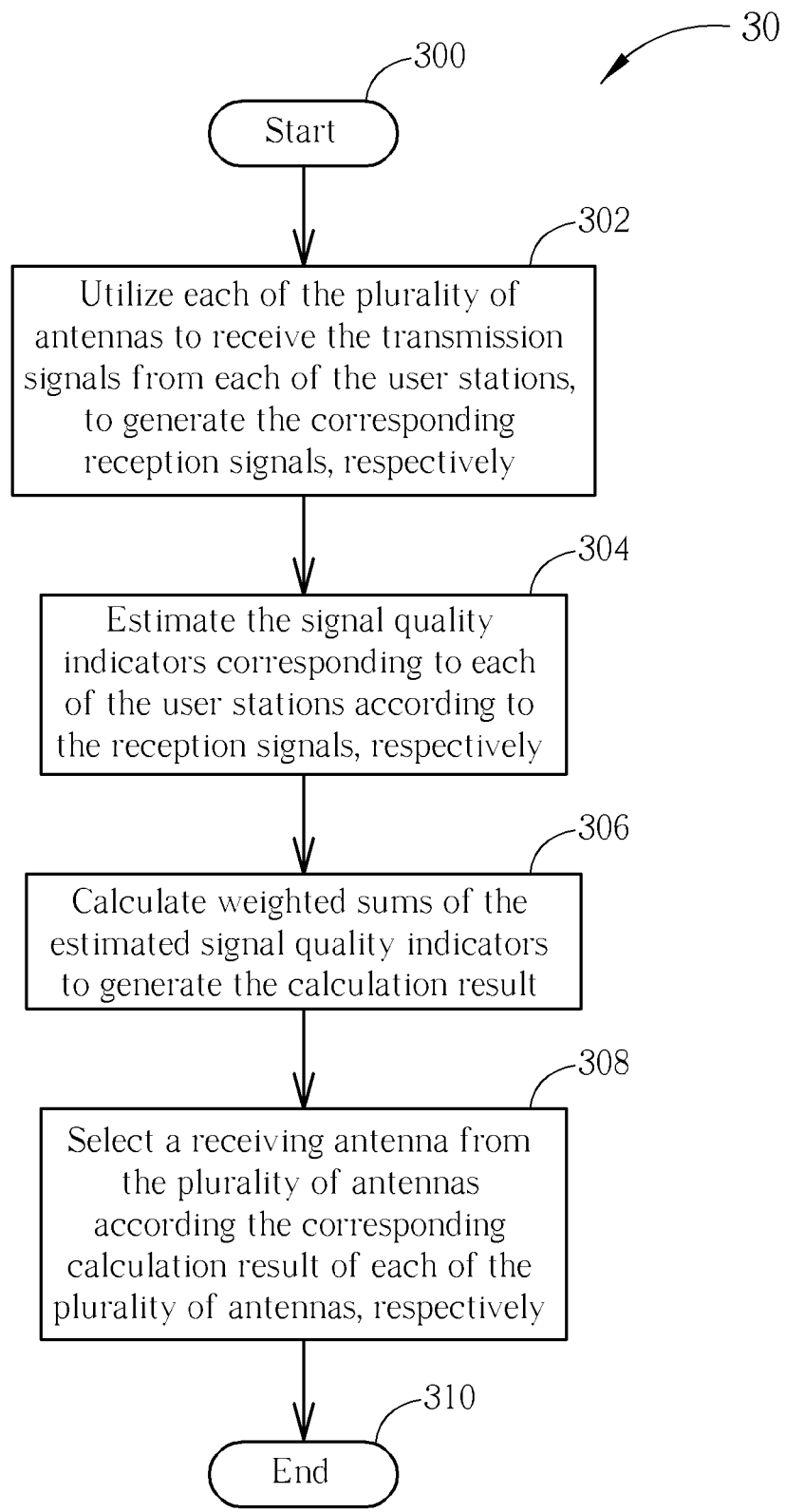
FIG. 3 is a schematic diagram of a process according to an embodiment of the present invention.

For more detailed operations of the antenna selection mechanism of the wireless network system 20, please refer to the following. Please refer to FIG. 3, which is a schematic diagram of a process 30 according to an embodiment of present invention. The process 30 is utilized for implementing the antenna selection operation process in the above-mentioned wireless network system 20, and includes the following steps:

Step 300: Start.

Step 302: Utilize each of the plurality of antennas to receive the transmission signals from each of the user stations, to generate the corresponding reception signals, respectively.

Step 304: Estimate the signal quality indicators corresponding to each of the user stations according to the reception signals, respectively.

Step 306: Calculate weighted sums of the estimated signal quality indicators to generate the calculation result.

Step 308: Select a receiving antenna from the plurality of antennas according the corresponding calculation result of each of the plurality of antennas, respectively.

Step 310: End.

According to the process 30, the wireless network system 20 may estimate the weighted sum information of the signal quality indicators of the wireless signals received by each of the antennas via the Steps 302 to 306, and then select the receiving antenna via the Step 308 accordingly, before the user stations STA_A and STA_B start to build a connection with the access point AP. Related detailed descriptions are as follows.

In the Step 302, the wireless network system 20 receives the wireless signals transmitted by the user stations STA_A and STA_B via the antennas ANT1 and ANT2, respectively. The antenna ANT1 receives the transmission signals ST1 and ST2 respectively transmitted by the user stations STA_A and STA_B, and the antenna ANT2 receives the transmission signals ST3 and ST4 respectively transmitted by the user stations STA_A and STA_B. Next, the radio frequency transmission signals ST1, ST2, ST3 and ST4 are converted into baseband reception signals SR1, SR2, SR3 and SR4, respectively, via the signal conversion unit 202 of the antenna selection device 200.

In the Step 304, the signal quality estimation unit 204 may estimate the corresponding signal quality indicators RSSI1, RSSI2, RSSI3 and RSSI4 according to the reception signals SR1, SR2, SR3 and SR4, respectively. Note that, received signal strength indication (RSSI) is used as the signal quality indicators as an example according to an embodiment of the present invention, but the quality indicators are not limited thereto. Other parameters such as signal-to-noise ratio (SNR), packet error rate (PER), etc. may all be used as signal quality indicators. Moreover, conventional techniques directly obtain the RSSI of the corresponding antenna recorded in the baseband reception signals, but according to an embodiment of the present invention, the signal quality estimation unit 204 reads the RSSI recorded in receive descriptors (RX Descriptor) of each of the reception signals. A packet field of the receive descriptors contains information of the corresponding user stations and access point. Therefore, the signal quality estimation unit 204 can obtain and verify a communication target record of the packet field in the receive descriptor to ensure that the reception signals are indeed the signals sent out by user stations connected to the access point AP. After that, the signal quality estimation unit 204 can read the RSSI recorded in the corresponding packet field. In other words, in the Step 306, the signal quality indicators obtained by the signal quality estimation unit 204 are guaranteed to belong to the packet signals sent from the corresponding user stations. In contrast to conventional techniques which cause incorrect evaluation results due to mistakenly obtaining information from other unrelated user stations, the present invention correctly obtains the signal strength information between the user stations and antennas that are intended to be evaluated.

Next, after estimating the signal quality indicators corresponding to each of the reception signals (Step 304), and after generating the weight factors via the setting unit 206 (Step 306), the signal calculation unit 208 may calculate the weighted sums of the signal quality indicators estimated in the Step 304 according to the weight factors generated by the setting unit 206, to generate the calculation results corresponding to each of the antennas. For example, a calculation result R1 corresponding to the antenna ANT1 is R1=RSSI1*W1+RSSI2*W2, and a calculation result R2 corresponding to the antenna ANT2 is R2=RSSI3*W3+RSSI4*W4. As such, signal quality indicators of different magnitudes are matched with different weight factors, thereby ensuring that user stations with signal strengths that are weaker, yet still sufficient for communication, are not neglected because of a presence of other user stations with excellent signal strengths.

Moreover, in the Step 306, the setting unit 206 generates corresponding weight factors according to different working environment requirements, such that the signal quality indicators of each of the reception signals may provide a more precise basis for determination via different weighted distributions. For example, for signals received by a same antenna, the setting unit 206 may assign a greater weight factor to smaller signal quality indicators (e.g. signal quality indicators lower than a threshold value), and assign a smaller weight factor to larger signal quality indicators (e.g. signal quality indicators higher than a threshold value). Alternatively, in a wireless network having multiple stations, for each of the antennas, it is possible to obtain the signal quality indicators of each of the stations relative to this antenna via the steps 300 to 304. Next, all of the signal quality indicators are grouped according to the threshold indication value into a high signal strength group (for signal quality indicators greater than the threshold indication value) and a low signal strength group (for signal quality indicators lower than the threshold indication value). Afterwards, average values of the signal quality indicators in the high signal strength group and the low signal strength group are calculated, respectively. Subsequently, after multiplying the two calculated average values by their corresponding weight factors, respectively, a sum of the two multiplied products corresponds to a calculation result of this antenna, wherein a weight factor assigned to the average value of the high signal strength group may be set to be smaller than a weight factor assigned to the average value of the low signal strength group. The aforementioned threshold indication value may be set according to design requirements of the wireless communication network system. For example, assume that the threshold indication value is set to −80 dBm, then signal quality indicators greater than −80 dBm would fall into the high signal strength group, and signal quality indicators less than −80 dBm would fall into the low signal strength group.

In the Step 308, the decision unit 210 may utilize the calculation results obtained in the aforementioned step as a basis for selecting the receiving antenna, and select a suitable antenna to provide each of the user station to carry out communication connection with the access point. For example, the decision unit 210 may determine a suitable receiving antenna according to the calculated overall average signal strength in the aforementioned steps. In other words, the decision unit 210 may compare magnitudes of the calculation results R1 and R2, and select the antenna ANT1 as the receiving antenna when the calculation result R1 is greater than the calculation result R2; and select the antenna ANT2 as the receiving antenna when the calculation result R1 is less than the calculation result R2, but this is not limited thereto. The present invention may also utilize other antenna selection algorithms in conjunction with the information obtained in the aforementioned steps to perform antenna selection.

Figure 1A:
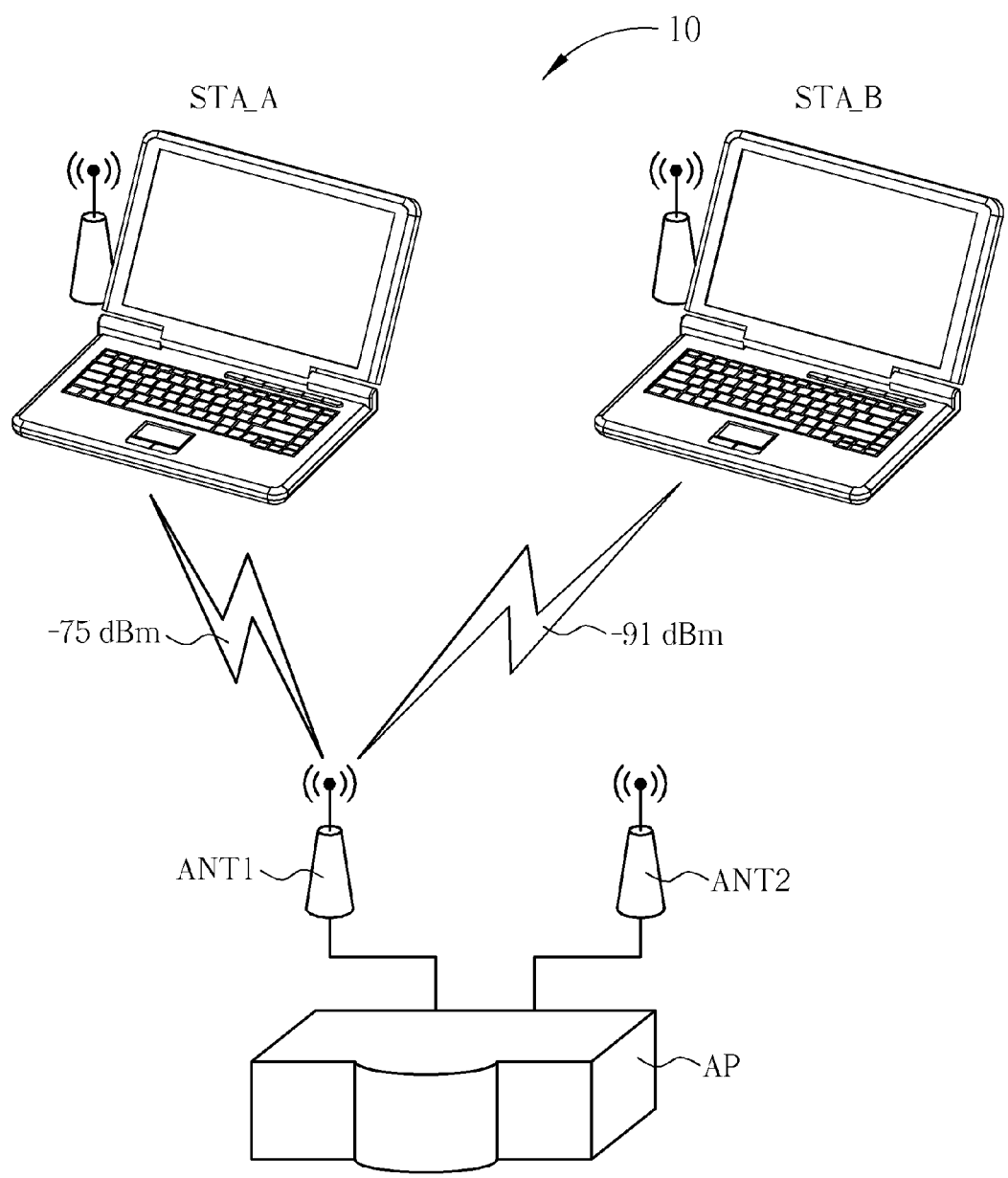
FIGS. 1A and 1B are schematic diagrams of each antenna of a conventional wireless network system during transmission with user stations, respectively.
Figure 1B:
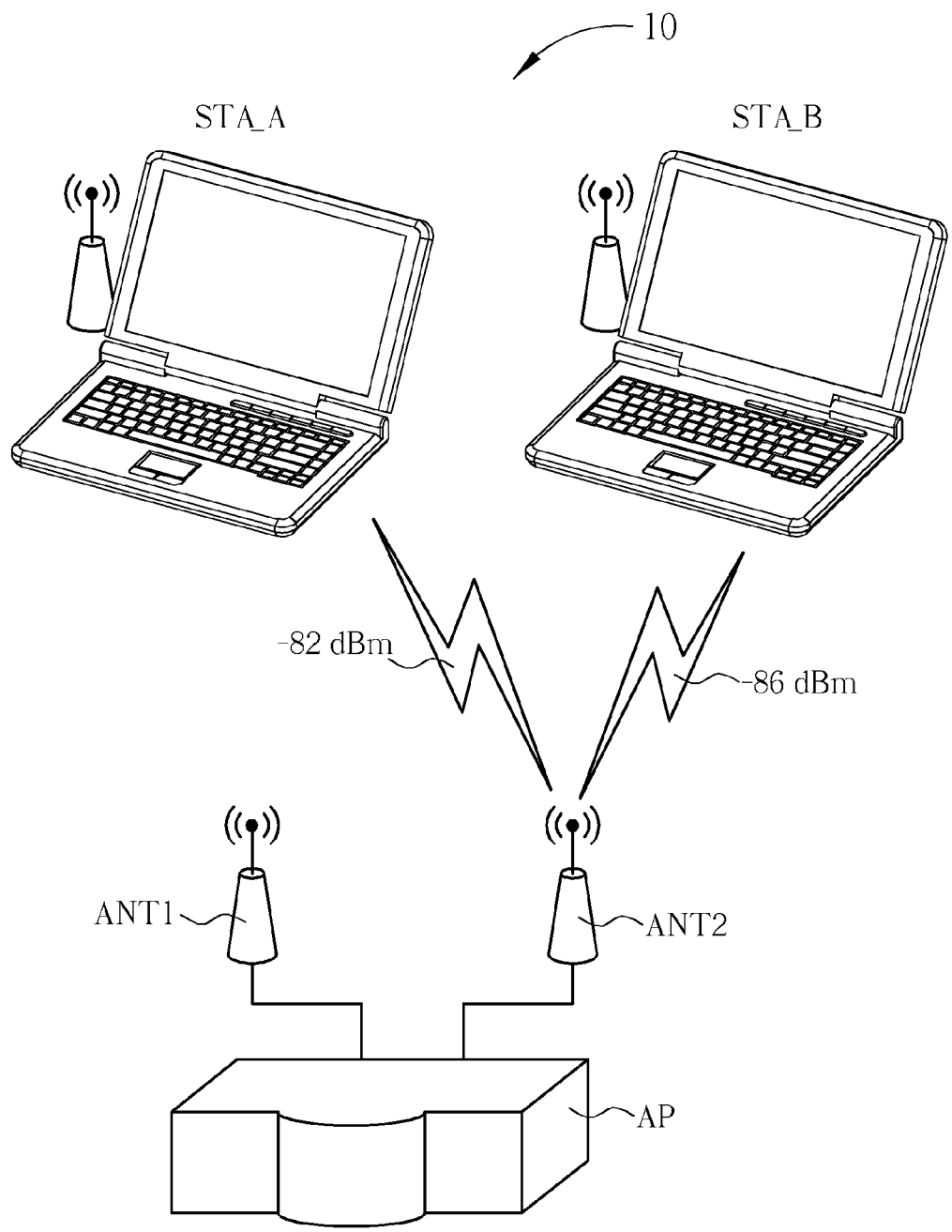

The following further illustrates operations of the process 30 with FIGS. 1A and 1B as examples. Firstly, assume the RSSI obtained via the steps 302 to 304 are as follows: the RSSI values of the packet signals received by the antenna ANT1 from the user stations STA_A and STA_B are −75 dBm and −91 dBm, respectively; and RSSI values of the packet signals received by the antenna ANT2 from the user stations STA_A and STA_B are −82 dBm and −86 dBm, respectively. Next, via the Step 304, the setting unit 206 assigns a weight factor of 0.3 to a RSSI of the user stations STA_A and STA_B that is greater than −85 dBm (i.e. the threshold indication value is set to −85 dBm); and assigns a weight factor of 0.7 to a RSSI of the user stations STA_A and STA_B that is less than −85 dBm. The signal calculation unit 208 calculates the calculation result R1 to be −86.2 dBm (R1=−75 dBm*0.3−91 dBm*0.7=−86.2 dBm), and the calculation result R2 to be −84.8 dBm (R2=−82 dBm*0.3−86 dBm*0.7=−84.8 dBm). Finally, via the Step 308, since the calculation result R2 is greater than the calculation result R1, the antenna ANT2, having a higher overall average signal strength, is selected as the receiving antenna. As such, via an embodiment of the present invention, it is possible to select an optimal receiving antenna such that the user stations STA_A and STA_B may successfully connect to the access point. In contrast, the prior art mistakenly selects the antenna ANT1 as the receiving antenna, causing the signal strength between the user station STA_B and the antenna ANT1 to be too weak for connection.

In summary, the present invention estimates the overall average signal strengths between the related stations and antennas via assigning different weight factors to the signal quality indicators of each of the reception signals, to sample the signal strengths more precisely and to make the correct antenna selection accordingly. As such, for antenna diversity applications, it is possible to effectively cover all user stations in the entire range of the wireless network system while ensuring connection quality, thereby greatly enhancing the overall system transmission efficiency. On the other hand, the present invention obtains the information in receive descriptors of packet signals as the basis for determination, which allows correct signal strength information between user stations and antennas to be obtained, and this effectively eliminates interference from other wireless devices unrelated to the corresponding access point, and helps achieve precise determination.

Those skilled in the art will readily observe that numerous modifications and alterations of the device and method may be made while retaining the teachings of the invention.

What is claimed is:

1. An antenna selection method, comprising:
utilizing each of a plurality of antennas to receive a plurality of transmission signals from a plurality of stations, respectively;
generating a plurality of reception signals according to the plurality of transmission signals by a signal conversion unit;
estimating a plurality of signal quality indicators corresponding to the plurality of stations according to the plurality of reception signals for each of the plurality of antennas, respectively, by a signal quality estimation unit;
calculating a weighted sum of the plurality of signal quality indicators to generate a calculation result for each of the plurality of antennas by a signal calculation unit; and
selecting a receiving antenna from the plurality of antennas according to the corresponding calculation result of each of the plurality of antennas, respectively, by a decision unit;
wherein the plurality of antennas comprise at least a first antenna and a second antenna, and the step of calculating a weighted sum of the plurality of signal quality indicators to generate a calculation result for each of the plurality of antennas, comprise:
calculating a first weighted sum of a plurality of signal quality indicators respectively corresponding to the plurality of stations for the first antenna to generate a first calculation result for the first antenna; and,
calculating a second weighted sum of a plurality of signal quality indicators respectively corresponding to the plurality of stations for the second antenna to generate a second calculation result for the second antenna.

2. The antenna selection method of claim 1, wherein the steps of estimating the plurality of signal quality indicators corresponding to the plurality of stations according to the plurality of reception signals for each of the plurality of antennas, respectively, comprise:
obtaining a received signal strength indication (RSSI) value recorded in a receive descriptor of the plurality of reception signals for each of the plurality of antennas, respectively, as the plurality of signal quality indicators corresponding to the plurality of stations.

3. The antenna selection method of claim 1, wherein the steps of estimating the plurality of signal quality indicators corresponding to the plurality of stations according to the plurality of reception signals for each antenna of the plurality of antennas, respectively, further comprise:
obtaining and determining a communication target record in a receive descriptor of the plurality of reception signals for each of the plurality of antennas, respectively.

4. The antenna selection method of claim 1, wherein the steps of calculating the first weighted sum of the plurality of signal quality indicators respectively corresponding to the plurality of stations for the first antenna to generate the first calculation result for the first antenna comprise:
generating a plurality of corresponding weight factors according to the plurality of signal quality indicators respectively corresponding to the plurality of stations;
multiplying the plurality of signal quality indicators respectively corresponding to the plurality of stations by the plurality of corresponding weight factors, to generate a plurality of multiplied products, respectively; and calculating a first sum of the plurality of multiplied products, to generate the first calculation result.

5. The antenna selection method of claim 4, wherein the plurality of weight factors are related to the plurality of signal quality indicators.

6. The antenna selection method of claim 5, wherein each of the plurality of weight factors depends on a comparison result between the corresponding signal quality indicator and a threshold indication value, respectively.

7. The antenna selection method of claim 6, wherein the plurality of weight factors are inversely proportional to the plurality of corresponding signal quality indicators.

8. The antenna selection method of claim 4, wherein a sum of the plurality of weight factors is a predefined value.

9. The antenna selection method of claim 1, wherein the steps of selecting the receiving antenna from the plurality of antennas according to the corresponding calculation result of each of the plurality of antennas comprise:
   comparing the plurality of calculation results, and selecting an antenna with a larger calculation result as the receiving antenna.

10. The antenna selection method of claim 1, wherein the plurality of signal quality indicators are received signal strength indication values.

11. An antenna selection device for a wireless network system having a plurality of antennas, comprising:
   a signal conversion unit, coupled to the plurality of antennas, for converting a plurality of transmission signals received by each of the plurality of antennas into a plurality of reception signals, wherein the plurality of transmission signals are from a plurality of stations of the wireless network system;
   a signal quality estimation unit, coupled to the signal conversion unit, for estimating a plurality of signal quality indicators corresponding to the plurality of stations according to the plurality of reception signals for each of the plurality of antennas, respectively;
   a setting unit, coupled to the signal quality estimation unit, for generating a plurality of weight factors according to the plurality of signal quality indicators;
   a signal calculation unit, coupled to the signal quality estimation unit and the setting unit, for calculating a first weighted sum of a plurality of signal quality indicators respectively corresponding to the plurality of stations for a first antenna of the plurality of antennas to generate a first calculation result for the first antenna, and calculating a second weighted sum of a plurality of signal quality indicators respectively corresponding to the plurality of stations for a second antenna of the plurality of antennas to generate a second calculation result for the second antenna;
   a decision unit, coupled to the signal calculation unit, for selecting a receiving antenna from the plurality of antennas according to corresponding calculation results of the plurality of antennas, respectively, to provide at least an access point in the wireless network system and the plurality of stations to build a communication connection.

12. The antenna selection device of claim 11, wherein the signal quality estimation unit obtains a received signal strength indication (RSSI) value recorded in a receive descriptor of the plurality of reception signals, respectively, as the plurality of signal quality indicators corresponding to the plurality of stations.

13. The antenna selection device of claim 11, wherein the signal quality estimation unit obtains and determines a communication target record in a receive descriptor of the plurality of reception signals.

14. The antenna selection device of claim 11, wherein the signal calculation unit multiplies the plurality of signal quality indicators respectively corresponding to the plurality of stations by the plurality of corresponding weight factors for the first antenna, to generate a plurality of multiplied products, respectively, and calculates a first sum of the plurality of multiplied products to generate the first calculation result.

15. The antenna selection device of claim 11, wherein the plurality of weight factors are related to the plurality of signal quality indicators.

16. The antenna selection device of claim 15, wherein each of the plurality of weight factors depends on a comparison result between the corresponding signal quality indicator and a threshold indication value.

17. The antenna selection device of claim 16, wherein the plurality of weight factors are inversely proportional to the plurality of corresponding signal quality indicators.

18. The antenna selection device of claim 11, wherein a sum of the plurality of weight factors is a predefined value.

19. The antenna selection device of claim 11, wherein the decision unit compares the plurality of calculation results and selects an antenna with a larger calculation result as the receiving antenna.

20. The antenna selection device of claim 11, wherein the plurality of signal quality indicators are received signal strength indication values.

* * * * *